United States Patent
Paul

(10) Patent No.: US 7,043,917 B2
(45) Date of Patent: May 16, 2006

(54) NUCLEAR POWER PLANT WITH UNIVERSAL CARNOT CYCLE TURBINE

(76) Inventor: Marius A. Paul, 1120 E. Elm Ave., Fullerton, CA (US) 92831

(*) Notice: Subject to any disclaimer, the term of this patent is extended or adjusted under 35 U.S.C. 154(b) by 0 days.

(21) Appl. No.: 10/913,169

(22) Filed: Aug. 6, 2004

(65) Prior Publication Data

US 2006/0026962 A1  Feb. 9, 2006

(51) Int. Cl.
  *G21D 5/00* (2006.01)
(52) U.S. Cl. .................................... 60/644.1; 60/670
(58) Field of Classification Search ............ 60/644.1, 60/670, 39.182; 415/115, 116
See application file for complete search history.

(56) References Cited

U.S. PATENT DOCUMENTS

| | | | |
|---|---|---|---|
| 2,648,519 A * | 8/1953 | Campini | 415/115 |
| 2,952,974 A * | 9/1960 | Wright | 60/39.3 |
| 3,043,763 A * | 7/1962 | Spillmann | 376/391 |
| 3,172,258 A * | 3/1965 | Pacault | 60/39.182 |
| 5,867,977 A * | 2/1999 | Zachary et al. | 60/39.53 |
| 6,382,903 B1 * | 5/2002 | Caruso et al. | 415/1 |
| 6,415,275 B1 * | 7/2002 | Zahn | 706/47 |
| 6,450,768 B1 * | 9/2002 | Mashey | 416/96 R |
| 6,644,012 B1 * | 11/2003 | Hoffmann et al. | 60/39.182 |

* cited by examiner

*Primary Examiner*—Hoang Nguyen
(74) *Attorney, Agent, or Firm*—Richard Esty Peterson, Esq.

(57) ABSTRACT

An efficient turbine system that preferably utilizes nuclear thermal energy in a unique combined Carnot cycle and Rankine cycle in a closed cogenerative and regenerative cycle with a condensible working fluid heated by the nuclear thermal energy and delivered to each stage of a multiple-stage gas turbine for isothermal expansion with a portion of the spent working fluid condensed and injected onto stators before and between the turbine blade stages and onto the turbine blades for a regenerative cogeneration expansion that supplements and combines with the primary working fluid in the staged gas turbine and in a final adiabatic expansion in a staged recovery turbine with work extracted by electric generators.

16 Claims, 1 Drawing Sheet

NUCLEAR POWER PLANT WITH UNIVERSAL CARNOT CYCLE TURBINE

BACKGROUND OF THE INVENTION

This invention relates to an energy recovery system, particularly a recovery system that extracts energy from a high temperature thermal source, such as a nuclear power reactor, and converts such thermal energy to electrical energy.

In the preferred embodiment, the thermal energy source is a nuclear reactor, however, other high temperature thermal sources, such as chemical combustors, magma pools, and other thermal sources where heat may be recovered by a closed loop working fluid may be used.

A nuclear reactor has a universal applicability for providing nuclear energy for generation of power on land, sea and space. Compact nuclear plants can operate in remote areas: on islands, in deserts and virtually at any remote location to generate electrical power.

Off-shore floating power plants can be designed with minimal environmental impact to utilize the cold sink of the ocean for condensation to efficiently generate electricity at any coastal location in the world to provide unlimited sources of energy.

However, the typical compact nuclear reactors developed for military applications convert thermal energy to electrical power at low efficiencies. It is an object of this invention to provide a turbine system with combined Carnot and Rankine cycles to efficiently convert a high temperature heat source, particularly nuclear energy, to electrical energy. The system is designed for use with a cooling endothermic fluid that is preferably condensible, such as water, liquid metals or other specialty compounds used in closed loop phase change systems.

SUMMARY OF THE INVENTION

The energy recovery system of this invention is in the form of a power plant associated with a thermal source, such as a nuclear reactor. The system uses an endothermic working fluid that can be pumped as a cooled liquid at very high pressure exceeding 100 bars into a thermal source to isobarically heat the fluid to the maximum temperature of the heat source. In the case of a nuclear reactor, the working fluid may extract heat from the reactor through an intermediate heat exchanger that is an integral part of the reactor.

Since the working fluid is contained in a closed loop, a variety of different known fluids can be used with appropriate modification of the turbine components. In the preferred embodiment described, the working fluid is water which is heated as isobaric fluid to be transformed to a superheated steam supplied to an isothermal, staged gas turbine, operating in a Carnot cycle with a combined Rankine cycle through a staged injection of condensed liquid. The working fluids from the combined cycles are combined for adiabatic expansion in a coupled, two-stage recovery turbine.

The spent expanded gases are condensed and recycled to the nuclear reactor to form a continuous closed cycle. Since the thermal cycle operates on a pressurized liquid pumped at high pressure to the thermal source to absorb the highest available temperature at the thermal source, an isothermal maximum temperature can be achieved in the superheated steam delivered simultaneously to the multiple stages of the gas turbine. The Carnot cycle thereby operates at a maximum absolute. To temper the high temperatures in the staged turbine, a regenerative injection of condensed liquid in advance of, and in between turbine stages, cools the blades and flashes to steam for cogeneration in the multi-stage turbine in a combined Rankine cycle as previously described. The combined working fluid is finally adiabatically expanded in the recovery turbine, which may be coupled to or on a separate shaft from the multi-staged gas turbine.

DETAILED DESCRIPTION OF THE PREFERRED EMBODIMENTS

Figures 1, 2:
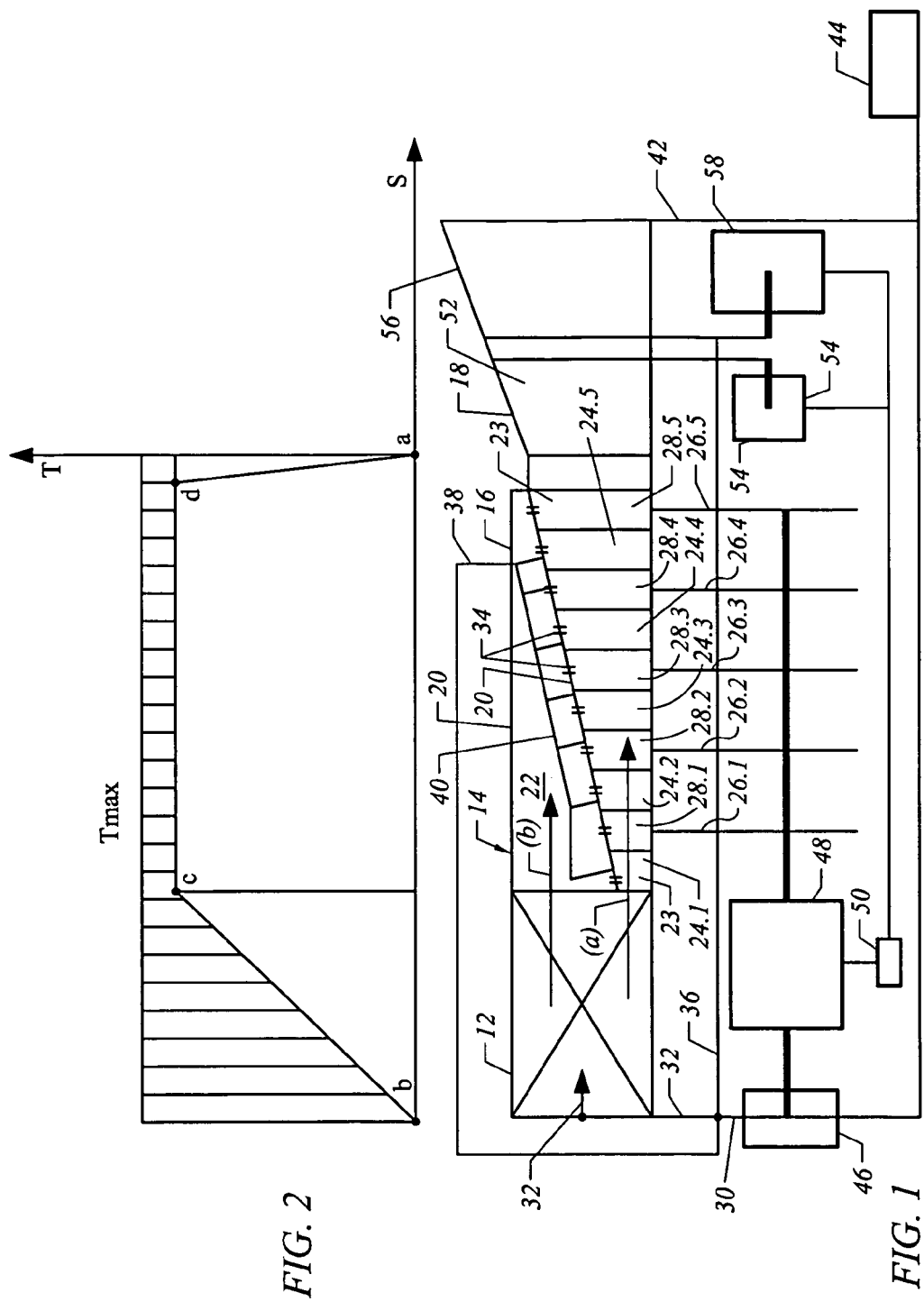
FIG. 1 is a schematic of the power plant with a diagrammatic cross section of one-half the turbine system.
FIG. 2 is a TS diagram of the universal Carnot cycle.

Referring to FIG. 1, a nuclear power plant is schematically illustrated and designated generally by the reference numeral 10. The nuclear power plant 10 includes a nuclear reactor 12 and a gas turbine system 14 with a multi-stage isothermal gas turbine 16, coupled to a two-stage adiabatic gas turbine 18.

Encompassing the outer periphery of the multi-stage turbine 16, is a high pressure shroud 20 that forms a conical, isothermal constant pressure chamber 22. The multi-stage turbine 16 has a series of stages 23 with stators 24.1–24.5 and rotors 26.1–26.5, having blades 28.1–28.5.

In the closed-loop water system 30 of the preferred embodiment, condensed water is circulated at high temperature around and through the reactor 12 on path 32 to convert to superheated steam released to the internals of the multi-stage gas turbine 16 by the main path of arrow (a) and to the chamber 22 of the shroud 20 by the auxiliary path of arrow (b). The shroud has perforations 34 to feed superheated steam along each stage of the turbine for operation in a Carnot cycle with an isothermal gas turbine expansion.

In order to maintain the multi-stage gas turbine within thermal design limits and to add cogenerative energy in a combined Rankine cycle, part of the condensed liquid from the closed-loop water system 30 is delivered through a conduit 36 to be injected onto the gas turbine rotor blades 28.1–28.5 and, also, between stages and onto the turbine stators 24.1–24.5 to cool the blades and stators and regeneratively flash to steam to add to the flow of the working fluid.

A second part of the condensed liquid is delivered through a conduit 38 to a series of spray nozzles 40 which spray the cooling fluid over the conical shroud 20, which by flash evaporation regenerates to a working fluid that combines into the main flow of the multi-stage turbine 16 and two-stage adiabatic turbine 18.

The expansion of the working gases will continue through the two-stage adiabatic turbine 18, which recovers the remaining useful energy before the expanded and cooled gases condense and return as liquid in conduit 42 to reservoir 44 or to the water system 30 through high pressure pump 46.

The multi-stage gas turbine 16 drives or is initially driven by the connected motor-generator 48, which drives the pump 46 and supplies generated power to the power supply 50. The two-stage turbine 18 has turbine stage 52 connected to generator 54 and turbine stage 56 connected to generator 58, which are in turn connected to the power supply 50 that stores or delivers power to the user.

Referring now to FIG. 2, a T-S diagram of the universal Carnot cycle is defined by the phases of:

isothermal liquid pressurization a-b;
isobaric heating in the nuclear reactor b-c;
isothermic expansion in the multi-stage gas turbine c-d;
adiabatic expansion in the two-stage recovery turbine d-a.

By definition, the thermal cycle is a real Carnot cycle, including a Rankine internal cogeneration regeneration cycle forming an efficient universal thermal cycle.

While in the foregoing embodiment of the present invention have been set forth in considerable detail for the purposes of making a complete disclosure of the invention, it may be apparent to those of skill in the art that numerous changes may be made in such detail without departing from the spirit and principles of the invention.

What is claimed is:

1. An efficient turbine system that utilizes nuclear thermal energy in a unique combined Carnot cycle and Rankine cycle in a closed cogenerative and regenerative cycle, comprising:
   a multi-stage gas turbine having multiple turbine stages;
   a condensible working fluid, heated by a thermal energy source to a superheated gas and delivered in a main path to the internals of the multi-stage gas turbine and in an auxiliary path to each stage of the multi-stage gas turbine as a superheated steam for isothermal expansion, wherein a portion of the condensed working fluid is injected as a liquid into the multi-stage gas turbine before and between the turbine stages for a regenerative cogeneration expansion as a gas that supplements and combines with the primary working fluid in the multi-stage gas turbine; and
   a multi-stage recovery turbine wherein the combined working fluid is delivered to the multi-stage recovery turbine with a final adiabatic expansion in the multi-stage recovery turbine with work extracted by electric generators connected to at least one of the turbines.

2. The turbine system of claim 1 wherein the multi-stage gas turbine has a shroud over the multiple turbine stages that forms a high pressure chamber with passages to each of the multiple stages of the turbine for feeding supplemental superheated gas to the multi-stage gas turbine.

3. The turbine system of claim 2 wherein the passages are perforations in the shroud at the turbine stages.

4. The turbine system of claim 2 wherein the working fluid is water.

5. The turbine system of claim 4 wherein the shroud has water injection nozzles for injecting water over the shroud for cooling the shroud wherein the water flashes to steam and adds to the working fluid in the multi-stage gas turbine.

6. The turbine system of claim 1 wherein the multi-stage gas turbine has turbine blades and stators and the portion of the condensed working fluid injected as a liquid into the multi-stage gas turbine before and between the turbine stages is injected onto the turbine blades and stators of the multi-stage gas turbine for cooling the turbine blades and stators.

7. An efficient turbine system that utilizes a thermal energy source in a combined Carnot cycle and Rankine cycle in a closed cogenerative and regenerative cycle comprising:
   a multi-stage gas turbine having multiple turbine stages;
   a condensible working fluid, heated by the thermal energy source to a superheated gas and delivered in a main path to the internals of a multi-stage gas turbine and in an auxiliary path to each stage of the multi-stage gas turbine for isothermal expansion wherein a portion of the condensed working fluid is injected as a liquid into the multi-stage gas turbine before and between the turbine stages for a regenerative cogeneration expansion as a gas that supplements and combines with the primary working fluid in the multi-stage gas turbine; and,
   a recovery turbine wherein the combined working fluid is delivered to the recovery turbine with a final adiabatic expansion in the recovery turbine with work extracted by electric generators connected to at least one of the turbines.

8. The turbine system of claim 7 wherein the multi-stage gas turbine has a shroud over the multiple turbine stages that forms a high pressure chamber with passages to each of the multiple stages of the turbine for feeding supplemental superheated gas to the multi-stage gas turbine.

9. The turbine system of claim 8 wherein the passages are perforations in the shroud at the turbine stages.

10. The turbine system of claim 8 wherein the working fluid is water.

11. The turbine system of claim 8 wherein the shroud has water injection nozzles for injecting water over the shroud for cooling the shroud wherein the water flashes to steam and adds to the working fluid in the multi-stage gas turbine.

12. The turbine system of claim 7 wherein the multi-stage gas turbine has turbine blades and stators and the portion of the condensed working fluid injected as a liquid into the multi-stage gas turbine before and between the turbine stages is injected onto the turbine blades and stators of the multi-stage gas turbine for cooling the turbine blades and stators.

13. The turbine system of claim 7 wherein the thermal energy source is nuclear thermal energy.

14. The turbine system of claim 7 wherein the recovery turbine is connected to an electrical generator.

15. The turbine system of claim 7 wherein the working fluid is expanded in the recovery turbine and condensed for return to the cycle.

16. The turbine system of claim 7 wherein the turbine system has a high pressure pump and condensed working fluid is returned to a fluid supply system by the high pressure pump.

* * * * *